US008587828B2

(12) United States Patent
Qiao et al.

(10) Patent No.: US 8,587,828 B2
(45) Date of Patent: Nov. 19, 2013

(54) SYSTEMS AND METHODS OF COLOR CONVERSION WITH GRAY VALUES

(75) Inventors: Yue Qiao, Longmont, CO (US); Larry M. Ernst, Longmont, CO (US); Vladimir V. Shestak, Fort Collins, CO (US)

(73) Assignee: Ricoh Production Print Solutions, Boulder, CO (US)

( * ) Notice: Subject to any disclaimer, the term of this patent is extended or adjusted under 35 U.S.C. 154(b) by 579 days.

(21) Appl. No.: 12/569,631

(22) Filed: Sep. 29, 2009

(65) Prior Publication Data

US 2011/0075163 A1 Mar. 31, 2011

(51) Int. Cl.
*G06F 15/00* (2006.01)
*G03F 3/08* (2006.01)
*G09G 3/36* (2006.01)
*G09G 5/02* (2006.01)

(52) U.S. Cl.
USPC ............... 358/1.9; 358/520; 345/89; 345/589

(58) Field of Classification Search
USPC .......................................... 358/3.02; 345/89
See application file for complete search history.

(56) References Cited

U.S. PATENT DOCUMENTS

| 7,382,915 B2 | 6/2008 | Bala et al. | |
| 2004/0196475 A1 | 10/2004 | Zeng et al. | |
| 2006/0007510 A1 | 1/2006 | Nishide et al. | |
| 2006/0098219 A1 | 5/2006 | Kajihara | |
| 2006/0250412 A1* | 11/2006 | Chen et al. | 345/589 |
| 2007/0091374 A1* | 4/2007 | Zeng et al. | 358/3.02 |
| 2007/0296985 A1 | 12/2007 | Ernst et al. | |
| 2008/0273748 A1 | 11/2008 | Meiring et al. | |
| 2009/0015888 A1* | 1/2009 | Chen et al. | 358/522 |
| 2009/0103116 A1* | 4/2009 | Ariga et al. | 358/1.9 |

FOREIGN PATENT DOCUMENTS

JP 28178116 A2 7/2008

OTHER PUBLICATIONS ("Apparent Greyscale: A Simple and Fast Conversion to Perceptually Accurate Images and Video" by Kaleigh Smith, Pierre-Edouard Landes, Joelle Thollot, and Karol Myszkowski, Eurographics 2000, vol. 27, No. 2.*
CN 1798349, Pan et al, Jul. 5, 2006, Abstract.*
Smith et al., "Apparent Greyscale: A Simple and Fast Conversion to Perceptually Accurate Images and Video," Eurographics 2008 / G. Drettakis and R. Scopigno, vol. 27 (2008), No. 2.

* cited by examiner

*Primary Examiner* — Fan Zhang
(74) *Attorney, Agent, or Firm* — Duft, Bornsen & Fettig, LLP

(57) ABSTRACT

Methods and systems herein provide for the color conversion of image data with various levels of gray values, such as text. Such color conversion includes generating a CMYK conversion model by defining a gray region in the perceptual color space of the image data to convert the gray values of the gray region to a range of K values during CMYK color conversion of the image data and segmenting chroma values in a color lookup table that maps perceptual color values to CMYK color values. Lightness values in the color lookup table are adjusted using a perceptual model (e.g., a Heimholtz-Kohlrausch Effect model) based on the segmented chroma values to substantially maintain a lightness relationship between the gray values of the image data and the remaining color values of the image data. The image data is the converted to a CMYK color space using the generated CMYK conversion model.

12 Claims, 3 Drawing Sheets

SYSTEMS AND METHODS OF COLOR CONVERSION WITH GRAY VALUES

BACKGROUND

1. Field of the Invention

The invention relates to the field of printing systems, and in particular, to color conversion of image data that includes various levels of gray, such as text.

2. Statement of the Problem

In color printing, a printer prints input image data onto a tangible medium, such as paper, by converting colors in the image data to a color space of the printer. For example, the printer may have a CMYK color space that is used to represent the image data using various levels of Cyan (C), Magenta (M), Yellow (Y), and blacK (K). Before the image data is printed, the image data is converted to the typically smaller gamut of the CMYK printer. Because of this smaller gamut of that color space, precise representation of the image data is generally not possible as information is lost or misrepresented in the conversion process.

Adding to the complexity, the input image data may be a perceptual color space, such as CIEL*a*b*, that is visualized as three dimensional color space, where every color that humans can see is uniquely located. Though the CIEL*a*b* color space is a perceptual color space, it is not a perceptually uniform color space as the Euclidean distance in the space does not correspond to the perceptual distance. For example, the magnitude of the perceptual color difference generally depends upon the color location and the changing direction in chroma and hue. CIEL*a*b* increasingly overstates the magnitudes of perceived chroma differences. The human visual system (HVS) is sensitive to the change of chroma in the neutral color area and insensitive to the change of the chroma in a highly saturated color area. The CIEL*a*b* color space is also non-uniform regarding hue angle in that the thresholds of visual tolerances are a function of hue angle. If the non-uniformity of the CIEL*a*b* color space in chroma and hue is examined from another perspective, CIEL*a*b* colors have different characteristics at different locations.

A color conversion model can be generated using this data to convert color values of the CIEL*a*b* space to the CMYK space. Generally, the relationship between CMYK color space and the CIEL*a*b* color space is nonlinear due to the interactions of cyan, magenta, yellow, and black planes, leading to more complex color conversion processing. Moreover, the printer may misregister the colors and improperly print them. Generally, misregistration regards the printer's inability to precisely align different color planes. For example, to produce a certain gray value, the printer may drop a certain amount of cyan, magenta, yellow, and black on top of each other. When the drops are not correctly aligned, the misalignment causes the drops to blur. Misregistration is particularly problematic during the color conversion of gray values in that it leads to less than desirable gray representations in certain cases (e.g., unclear or "fuzzy" text, barcodes, etc.). That is, the printed gray representations of items such as text, barcodes, lines, and the like often appear unclear after standard color conversion and printing when compared to the original image data. Accordingly, there exists a need to convert colors that remain esthetically pleasing while ensuring that the converted gray values representing lines, text, barcodes, etc. are sharp and vivid.

SUMMARY

Embodiments described herein address the misregistration of gray values during color conversion through an International Color Consortium (ICC) profile generation and color rendering dictionary (CRD) conversion. In doing so, a "force K" ICC profile is derived from a regular full color ICC profile that is used to convert gray color values of input image data to single K values while making color differences of other affected colors perceptually invisible. The converted K values and their relationships with their neighboring grid points in the modified color conversion may be maintained using a perceptual lightness adjustment as a function of chroma, such as the Helmholtz-Kohlrausch Effect.

In one embodiment, a method of converting gray values of image data in a perceptual color space (e.g., CIEL*a*b* or RGB color values) to K values in a CMYK printing system includes generating a CMYK conversion model. The method includes defining a gray region in the perceptual color space of the image data to convert the gray values of the gray region to a range of K values during CMYK color conversion of the image data. The method also includes segmenting chroma values in a color lookup table. The color lookup table includes perceptual color values mapped to CMYK color values to perform the CMYK color conversion of the image data. The method also includes adjusting lightness values in the color lookup table based on the segmented chroma values to substantially maintain a lightness relationship between the gray values of the image data and the remaining color values of the image data. For example, the method may include adjusting lightness as a function of chroma of a portion of the image data to substantially maintain an esthetically pleasing relationship between the gray values of the image data and the remaining color values of the image data. The method also includes converting the image data to a CMYK color space using the generated CMYK conversion model.

Adjusting the lightness values may include processing the image data using a perceptual model (e.g., a Heimholtz-Kohlrausch Effect model). Alternatively or additionally, the lightness values may be adjusted by identifying a darkest color value in the image data for use as a lightness reference when adjusting the lightness values. The method may further include configuring the defined gray region in transfer curves of the perceptual color space or configuring the defined gray region in the color lookup table. In configuring the color lookup table with the defined gray region, the method may further include increasing the size of the color look up table based on the defined gray region Accordingly, a boundary of the gray region my fall on grid points within the color lookup table due to the increased size of the color lookup table. The method may also include smoothing the converted image data to compensate for abrupt transitions between converted gray color values and remaining converted color values.

In another embodiment, a printing system is operable to convert gray values of image data in a perceptual color space to K values in a CMYK printing system. The printing system includes a color transform module operable to generate a CMYK conversion model by defining a gray region in the perceptual color space of the image data and segmenting chroma values in a color lookup table. The color lookup table includes perceptual color values mapped to CMYK color values to perform the CMYK color conversion of the image data. The color transform module is further operable to adjust lightness values in the color lookup table based on the segmented chroma values to substantially maintain a lightness relationship between the gray values of the image data and the remaining color values of the image data. The color transform module is also operable to convert the image data to a CMYK color space using the generated CMYK conversion model to convert the gray values of the gray region to a range of K values in the CMYK color space. The printing system also includes a printer operable to print the converted image data to a tangible medium.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF THE EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
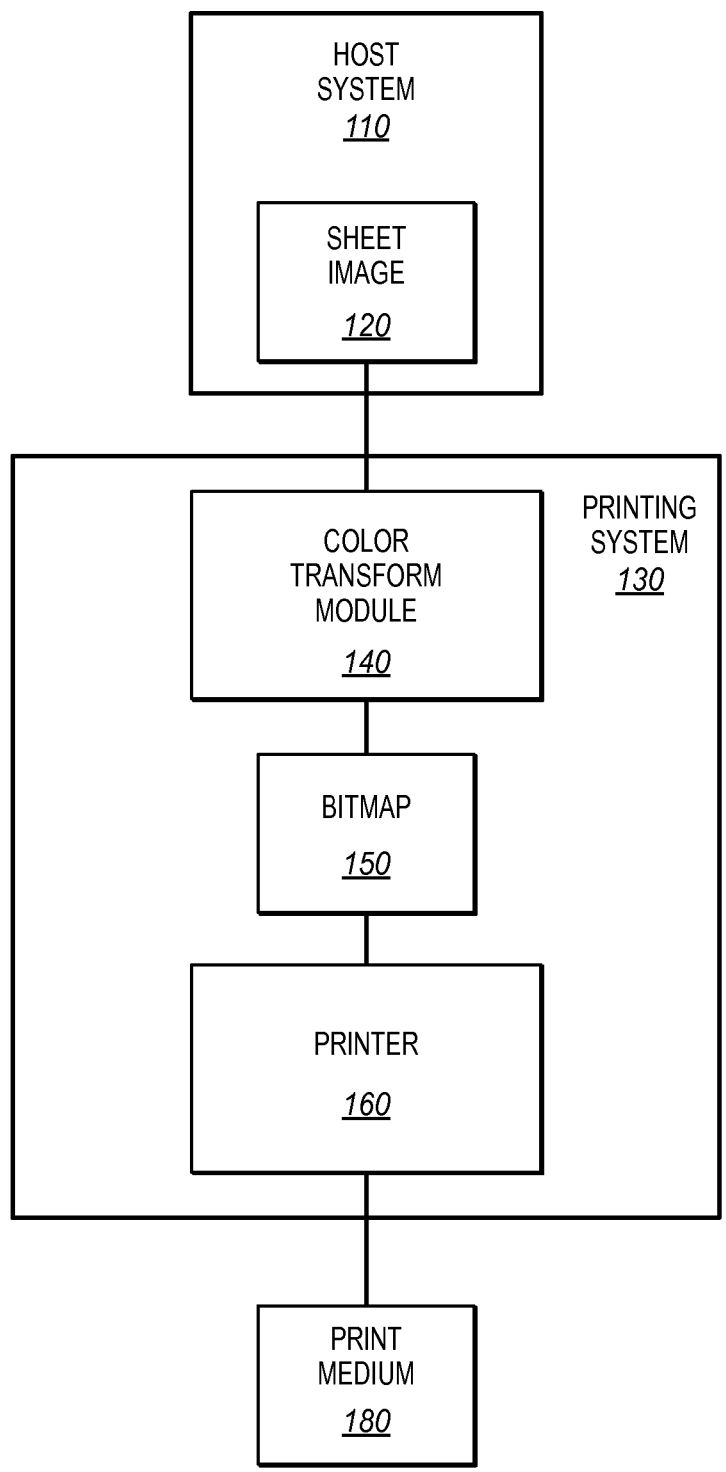
FIG. 1 is a block diagram illustrating a printing system in an exemplary embodiment.

FIG. 1 is a block diagram illustrating a CMYK printing system 130 in an exemplary embodiment. A host system 110 is in communication with the printing system 130 to print a sheet image 120 onto a print medium 180 via a printer 160. The resulting print medium 180 may be printed in color and/or in any of a number of gray shades, including black and white. The host system 110 may comprise any computing device, such as a personal computer or a server. The sheet image 120 may be any file or data that describes how an image on a sheet of print medium should be printed. For example, the sheet image 120 may include PostScript data, Printer Command Language ("PCL") data, and/or any other printer language data. The printing system 130 may be a high-speed printer operable to print relatively high volumes (e.g., greater than 100 pages per minute). The print medium 180 may be continuous form paper, cut sheet paper, and/or any other medium suitable for printing. The printing system 130, in one generalized form, includes the printer 160 that presents a bitmap 150 onto the print medium 180 (e.g., via toner, ink, etc.) based on the sheet image 120.

The color transform module 140 may be any system, device, software, circuitry and/or other suitable component operable to transform the sheet image 120 and generate the bitmap 150 in accordance with printing onto the print medium 180. The color transform module 140 may be configured with a print controller of the printing system 130 and/or any other portion of the printing system 130. In another embodiment, the color transform module 140 may be configured with the host system 110.

The color transform system 140 may process an ICC profile in order to transform the sheet image 120 to the bitmap 150 in a color space of the printing system 130. The ICC profile may be sent from the host system 110 in conjunction with sending the sheet image 120. The ICC profile may also be stored within the printing system 130 and may be selected when the printing system 130 is administered/configured to print the print medium 180. The ICC profile comprises a set of data characterizing the printing system 130 for printing various levels of gray and other colors in accordance with standards promulgated by the International Color Consortium. The ICC profile may have been provided by a manufacturer of the printing system 130 and/or a provider of the magnetic ink printing solution. The ICC profile may have been provided using a computer readable medium and/or otherwise distributed electronically (e.g., downloaded over a network).

Figure 2:
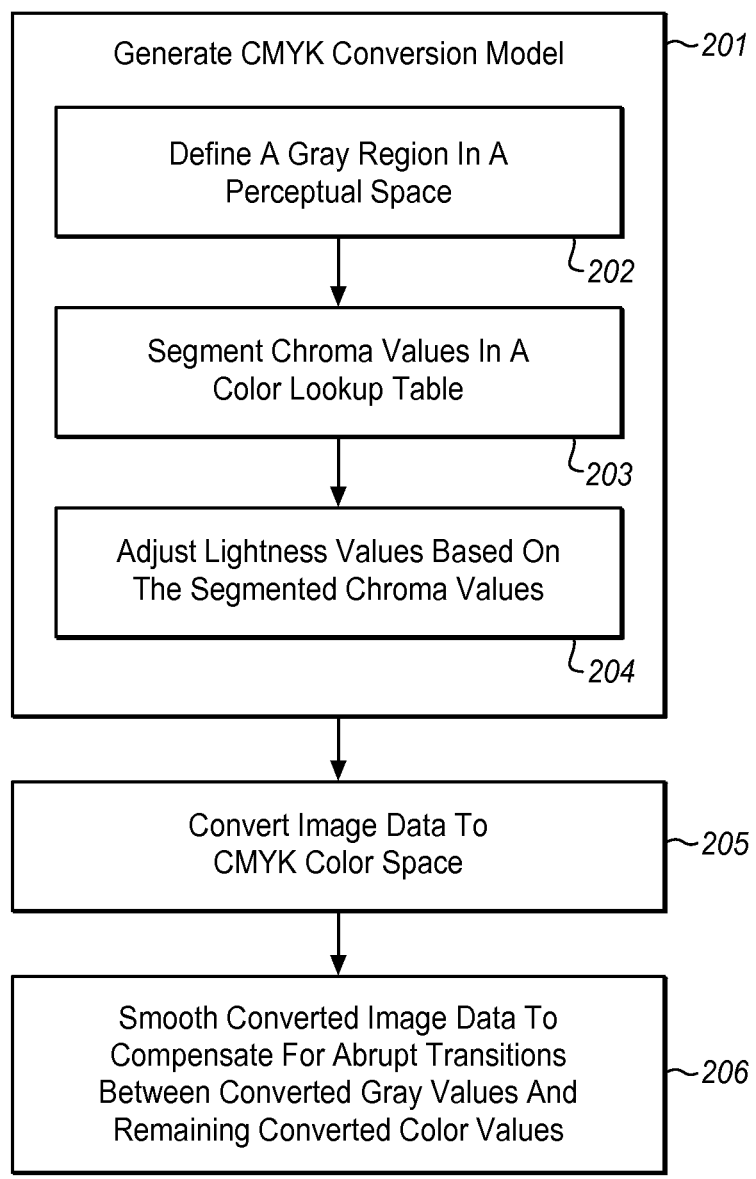
FIG. 2 is a flow chart illustrating a method of gray color conversion in an exemplary embodiment.

As noted above, previous color conversions in printing systems caused a misregistration that lead to unclear gray representations (e.g., unclear or "fuzzy" text, barcodes, lines, etc.). FIG. 2 is a flow chart illustrating a method of converting gray values of image data in the sheet image 120 to K values in a CMYK printing system in an exemplary embodiment that assists in reducing the problems associated with misregistration. The steps of the flow chart in FIG. 2 are not all inclusive and may include other steps not shown. The color transform module 140 first transforms the sheet image 120 to generate bitmaps 150. For example, the color transform module 140 (and/or other components of a print controller) may be operable to generate the bitmap 150 that is representative of the sheet image 120 for printing onto the print medium 180 via the printer 160. In doing so, the color transform module 140 may generate a CMYK conversion model in the process element 201.

Generating the color conversion model generally includes defining a gray region in the perceptual color space of the image data (e.g., a CIEL*a*b* color space or an RGB color space) in the process element 202. For example, the color transform module 140 may define a gray region in a CIEL*a*b* color space such that the color transform module 140 may subsequently convert the gray values of the gray region to a range of K values during CMYK color conversion of the image data. In this regard, the color transform module 140 may configure the defined gray region in one-dimensional CMYK transfer curves (e.g., the ICC color profile) that are used to convert the perceptual color space image data to the CMYK color space of the printer 160 (discussed in greater detail below). Alternatively, the color transform module 140 may configure the defined gray region in a color lookup table that is used to convert the perceptual color space image data to CMYK color space of the printer 160 (also discussed in greater detail below).

The color transform module 140 may also segment chroma values in a color lookup table in the process element 203. For example, the color lookup table may include perceptual color values that map to CMYK color values to perform the CMYK color conversion of the image data. The color transform module 140 may then adjust lightness values in the color lookup table based on the segmented chroma values, in the process element 204, to substantially maintain a lightness relationship between the gray values and the remaining color values of the image data.

With a CMYK conversion model generated, the color transform module 140 may convert the image data to the CMYK color space of the printer 160 in the process element 205. In this regard, the color transform module 140 may convert the defined gray region to single K values (e.g., 0, 0, 0, K, where K is some value of blacK with the Cyan, Magenta, and Yellow values "zeroed out"). The color transform module 140 may also use the generated CMYK conversion model to convert the remaining colors according to their adjusted values. For example, with the lightness values in the CMYK conversion model altered, the color transform module 140 may convert the remaining color values of the input image data to the CMYK color space in such a way that preserves the lightness relationship between the gray values and the remaining color values of the image data. In doing so, the color transform module may adjust the lightness values of the image data using a perceptual model, such as the Heimholtz-Kohlrausch Effect model. Alternatively or additionally, the color transform module 140 may determine a darkest color value in the image data and use that as a lightness reference when adjusting the lightness values of the image data. The color transform module 140 may even adjust the lightness of the image data according to a rendering intent.

Once the color transform module 140 converts the input image data to CMYK color space of the printer 160, the color transform module 140 may apply a smoothing algorithm to the converted image data to adjust for abrupt changes between the "forced K values" of the defined gray region and the remaining color values. For example, the color transform module 140 may filter the converted image data such that the converted gray range input transfer curves monotonically increase.

In configuring the defined gray region in the one-dimensional transfer curves (e.g., the 1-d input curve in the B2A tag in the ICC color profile), the color transform module 140 may determine that a particular CIEL*a*b* color value corresponds to a particular black CMYK value. Generally, there are three color conversions based on the rendering intents in such ICC color profiles, one for each of the CMYK colors. Traditionally, depending on the gray value of the input image data, the input gray value would be converted using some combination of cyan, magenta, yellow, and black. In this embodiment, however, a gray value of the input CIEL*a*b* data is forced to a range of black values (i.e., shades of gray). Thus, any gray values within the input data are forced to a range of K values during the color conversion. Once the input image data is converted to the CMYK color space, the color transform module 140 may smooth the converted image data in the process element 206. For example, in the CIEL*a*b* input image data, certain portions of the image data may include text, barcode, lines, etc. having a particular relationship with other color values in the CIEL*a*b* color space that allow those elements to be perceptually detected. In other words, the preserved relationship causes those elements to "stand out" in the viewed image. The color transform module 140 smooths these areas to reestablish the relationship between the converted text, barcode, lines, etc. and other CMYK color values used in the conversion. In doing so, the color transform module 140 may soften the transition between gray values and other CIEL*a*b* color values after the color conversion.

To further illustrate, in a CIEL*a*b* to CMYK color conversion, the color values a* and b* that are within the defined gray range on the input curves may be clipped to 0.5. The color values proximate to the two ends of this gray range may then be smoothed to ensure that the curves monotonically increase. The points within the gray range are thereby converted to single gray values. The converted L* value of such a grid point may then be compared with a neighbor converted L* value and a perceptual model, such as the Helmholtz-Kohlrausch Effect, may be used to adjust either the converted K values or the neighbor CMYK values.

In defining the gray region in the color lookup table, the color transform module 140 may increase a size of the color lookup table. For example, the color lookup table is used to convert input CIEL*a*b* color values to another color space, such as CMYK. Since the CIEL*a*b* color is a continuous color space, a lookup table for converting CIEL*a*b* color values to another color space would include an incredibly large number of color conversion values that onerously tax processing capabilities. Accordingly, the CIEL*a*b* color values are generally sampled at larger increments so as to create a color conversion lookup table with fewer grid points. In this embodiment, the range of gray values in the color conversion lookup table is increased. In other words, a sampling of the CIEL*a*b* color space is performed in a traditional manner that results in fewer color conversion values except, however, where those color conversions occur in the gray value region. Thus, the color transform module 140 refines the range of input gray values in the color conversion lookup table by increasing the number of samples within the color lookup table. The color transform module 140 then sets these input gray values to various K values in a CMYK color space. With the color conversion lookup table defined, the color transform module 140 converts the input image data to the CMYK color space using the color conversion lookup table. This refining of the input color space gray values and their subsequent conversion to explicit K values in the CMYK color space provides a sharp transition for various elements in the input image data (e.g., lines, barcodes, text, etc.) when converted.

Figure 3:
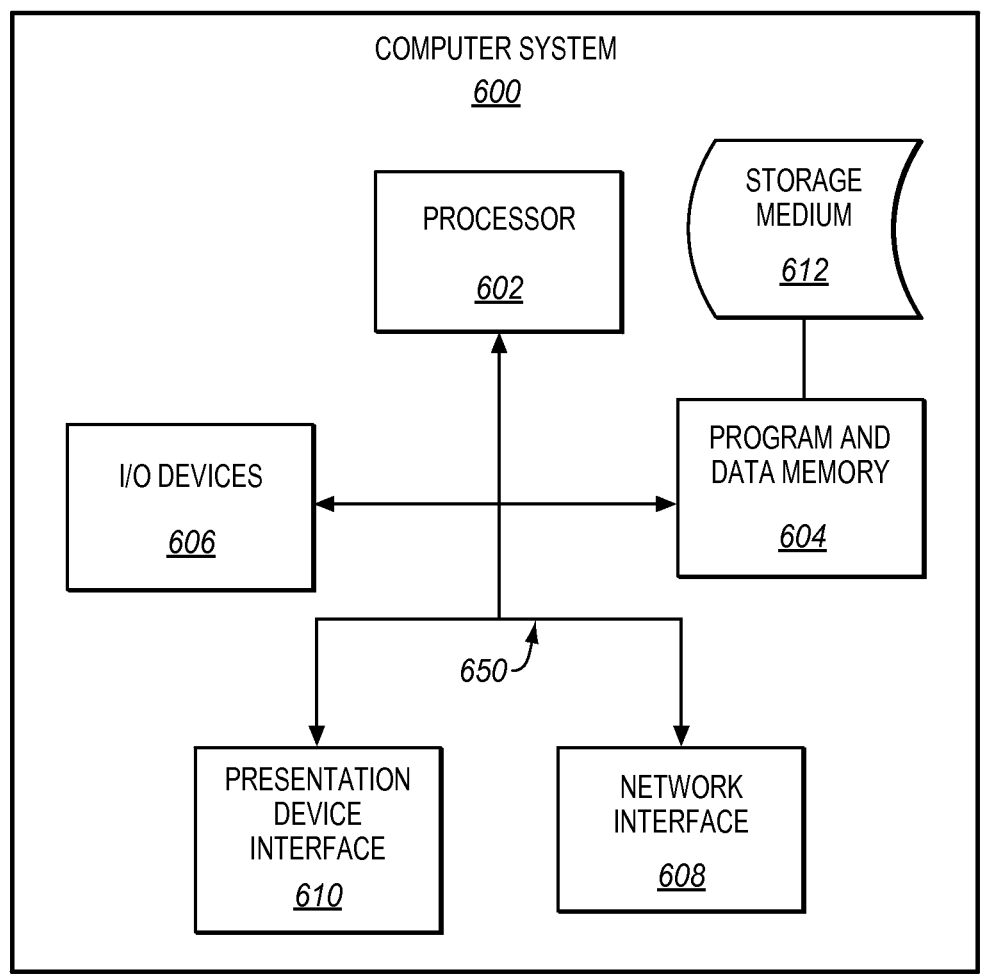
FIG. 3 illustrates a computer system operable to execute computer readable medium embodying programmed instructions to perform desired functions in an exemplary embodiment.

Embodiments of the invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 3 is a block diagram depicting a computer system 600 operable to provide features and aspects hereof by executing programmed instructions and accessing data stored on a computer readable storage medium 612.

Furthermore, embodiments of the invention can take the form of a computer program product accessible from a computer-usable or computer-readable medium 612 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A computer system 600 suitable for storing and/or executing program code will include at least one processor 602 coupled directly or indirectly to memory elements 604 through a system bus 650. The memory elements 604 can include local memory employed during actual execution of the program code, bulk storage, and cache memories which provide temporary storage of at least some program code and/or data in order to reduce the number of times code and/or data must be retrieved from bulk storage during execution.

Input/output or I/O devices 606 (including but not limited to keyboards, displays, pointing devices, etc) can be coupled to the system either directly or through intervening I/O controllers. Network adapter interfaces 608 may also be coupled to the system to enable the computer system 600 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 610 may be coupled to the system to interface to one or more presentation device such as printing systems and displays for presentation of presentation data generated by processor 602.

In the context of printing, the invention is not intended to be limited to any particular type of printer. For example, the color conversion described herein may be employed in either ink or toner based printers. Moreover, the color conversion may be employed in printers ranging in size from small household printers to large commercial printers. In one embodiment, the color conversion may be implemented as software instructions operable with a host system to force gray color values within input image data to K color values within a CMYK color space of a printer. Although specific embodiments were described herein, the scope of the invention is not limited to those specific embodiments. The scope of the invention is defined by the following claims and any equivalents thereof.

We claim:

1. A method of converting gray values of image data in a CIEL*a*b* perceptual color space to K values in a CMYK printing system, the method comprising:
    generating a CMYK conversion model, wherein generating comprises:
    defining a gray region in the perceptual color space of the image data to convert the gray values of the gray region to a range of K-only values of an ICC color profile during CMYK color conversion of the image data;
    segmenting chroma values in a color lookup table, wherein the color lookup table comprises CIEL*a*b* perceptual color values mapped to CMYK color values to perform the CMYK color conversion of the image data;
    adjusting lightness values in the color lookup table based on the segmented chroma values to substantially maintain a lightness relationship between the gray values of the image data and the remaining color values of the image data; and
    converting the image data to a CMYK color space using the generated CMYK conversion model,
    wherein segmenting chroma values in the color lookup table comprises:
    clipping a* and b* color values on input curves of the perceptual color space to 0.5; and
    smoothing ends of the defined gray region to monotonically increase the input curves, and
    wherein adjusting the lightness values in the color lookup table comprises:
    comparing L* values with neighboring L* values in the color lookup table; and
    using a Heimholtz-Kohlrausch Effect perceptual model to adjust corresponding K values in the color lookup table to adjust the lightness values of the converted image and clarify abrupt transitions of the gray region in the converted image.

2. The method of claim 1, further comprising identifying a darkest color value in the image data for use as a lightness reference when adjusting the lightness values.

3. The method of claim 1, wherein the perceptual color space of the image data comprises RGB color values.

4. The method of claim 1, further comprising configuring the defined gray region in transfer curves of the perceptual color space.

5. The method of claim 1, further comprising configuring the defined gray region in the color lookup table.

6. The method of claim 5, further comprising:
    refining a range of input gray values in the color lookup by increasing the size of the color lookup table; and
    setting the input gray values within the range to K color values of the CMYK color space.

7. The method of claim 1, further comprising smoothing the converted image data to compensate for abrupt transitions between converted gray color values and remaining converted color values.

8. A printing system having a non-transitory computer-readable recording medium to store a program for converting gray values of image data in a CIEL*a*b* perceptual color space to K-only values of an ICC color profile in a CMYK printing system, the printing system comprising:
    a color transform module operable to generate a CMYK conversion model by defining a gray region in the perceptual color space of the image data, segment chroma values in a color lookup table, wherein the color lookup table comprises CIEL*a*b* perceptual color values mapped to CMYK color values to perform the CMYK color conversion of the image data, wherein the color transform module is further operable to adjust lightness values in the color lookup table based on the segmented chroma values to substantially maintain a lightness relationship between the gray values of the image data and the remaining color values of the image data, and to convert the image data to a CMYK color space using the generated CMYK conversion model and convert the gray values of the gray region to a range of K values in the CMYK color space,
    segment chroma values in the color lookup table by clipping a* and b* color values on input curves of the perceptual color space to 0.5 and smoothing ends of the defined gray region to monotonically increase the input curves; and
    adjust the lightness values in the color lookup table by comparing L* values with neighboring L* values in the color lookup table and using a Heimholtz-Kohlrausch Effect perceptual model to adjust corresponding K values in the color lookup table to adjust the lightness values of the converted image and clarify abrupt transitions of the gray region in the converted image; and
    a printer operable to print the converted image data to a tangible medium.

9. The printing system of claim 8, wherein the color transform module is further operable to identify a darkest color value in the image data for use as a lightness reference when adjusting the lightness values.

10. The printing system of claim 8, wherein the color transform module is further operable to configure the defined gray region in transfer curves of the perceptual color space or in the color lookup table.

11. The printing system of claim 10, wherein the color transform module is further operable to refine a range of input gray values in the color lookup by increasing the size of the color lookup table and set the input gray values within the range to K color values of the CMYK color space.

12. The printing system of claim 8, wherein the color transform module is further operable to smooth the converted image data to compensate for abrupt transitions between converted gray color values and remaining converted color values.

\* \* \* \* \*